United States Patent
Keskitalo

[19]

[11] Patent Number: 5,936,999
[45] Date of Patent: Aug. 10, 1999

[54] RECEIVER AND METHOD FOR GENERATING SPREADING CODES IN A RECEIVER

[75] Inventor: Ilkka Keskitalo, Jääli, Finland

[73] Assignee: Nokia Telecommunications OY, Espoo, Finland

[21] Appl. No.: 08/722,170

[22] PCT Filed: Feb. 9, 1996

[86] PCT No.: PCT/FI96/00076
    § 371 Date: Oct. 10, 1996
    § 102(e) Date: Oct. 10, 1996

[87] PCT Pub. No.: WO96/24988
    PCT Pub. Date: Aug. 15, 1996

[30] Foreign Application Priority Data

Feb. 10, 1995 [FI] Finland ................................. 950600

[51] Int. Cl.⁶ .................................................. H04B 1/69
[52] U.S. Cl. .................................................... 375/200
[58] Field of Search ................................. 375/200, 208, 375/316, 324

[56] References Cited

U.S. PATENT DOCUMENTS

| | | |
|---|---|---|
| 4,930,140 | 5/1990 | Cripps et al. . |
| 4,984,247 | 1/1991 | Kaufmann et al. . |
| 5,260,967 | 11/1993 | Schilling . |
| 5,363,403 | 11/1994 | Schilling et al. . |
| 5,594,755 | 1/1997 | Hulbert ................................. 375/208 |
| 5,623,511 | 4/1997 | Bar-David et al. ..................... 375/200 |

FOREIGN PATENT DOCUMENTS

| | | |
|---|---|---|
| 606 546 | 7/1994 | European Pat. Off. . |
| 662 920 | 11/1994 | European Pat. Off. . |
| 661 831 | 7/1995 | European Pat. Off. . |
| 673 130 | 9/1995 | European Pat. Off. . |
| 2 282 300 | 3/1995 | United Kingdom . |
| 94/29985 | 12/1994 | WIPO . |

OTHER PUBLICATIONS

Modern Communication and Spread Spectrum, (McGraw–Hill, New York, 1986, chapter Twelve) pp. 344–375.

*Primary Examiner*—Temesghen Ghebretinsae
*Attorney, Agent, or Firm*—Pillsbury Madison & Sutro LLP

[57] ABSTRACT

A method for generating spreading codes in a receiver, and a receiver for use in a system wherein a signal to be transmitted is multiplied with a code sequence characteristic of each connection, wherein the receiver includes an estimator for estimating a channel, at least one demodulator and a combiner for combining signals obtained from at least one demodulator. In order to enable the use of long codes and to facilitate the internal synchronization of the receiver, the receiver includes a number of generators for generating a code sequence, the first generator producing a code sequence at a variable phase, and the second generator producing a code sequence the phase of which acts as a reference to the first generator.

11 Claims, 4 Drawing Sheets

RECEIVER AND METHOD FOR GENERATING SPREADING CODES IN A RECEIVER

This application is the national phase of international application PCT/FI96/00076, filed Feb. 9, 1996 which designated the U.S.

BACKGROUND OF THE INVENTION

The invention relates to a receiver for use in a system wherein a signal to be transmitted is multiplied with a code sequence characteristic of each connection, the receiver comprising means for estimating a channel, and one or more demodulator means, and means for combining signals received from the demodulator means.

The invention further relates to a method for generating spreading codes in a receiver, in which method a signal to be transmitted is multiplied with a code sequence characteristic of each connection, and in which receiver signal components transmitted with the desired code are sought from the received transmission, and the phases of the components are measured by correlating the received transmission with the code sequence generated in the receiver.

The receiver and the method according to the invention can be applied especially in a cellular system utilizing code division multiple access.

CDMA (Code Division Multiple Access) is a multiple access method, which is based on the spread spectrum technique and which has been applied recently in cellular radio systems, in addition to the earlier commercially implemented FDMA and TDMA methods. CDMA has several advantages over the earlier implemented methods, for example spectral efficiency and the simplicity of frequency planning.

In the CDMA method, the narrow-band data signal of the user is multiplied to a relatively wide band by a spreading code having a considerably broader band than the data signal. In known test systems, bandwidths such as 1.25 MHz, 2.5 MHz and 25 MHz have been used. In connection with multiplying, the data signal spreads to the entire band to be used. All users transmit by using the same frequency band simultaneously. A separate spreading code is used over each connection between a base station and a mobile station, and the signals of the users can be distinguished from one another in the receivers on the basis of the spreading code of each user.

A CDMA receiver comprises means, which can be implemented for example with correlators or matched filters, for synchronization with a desired signal, which is recognized on the basis of the spreading code. In the receiver, the data signal is restored to the original band by multiplying it again by the same spreading code as was used during the transmitting stage. Signals multiplied by some other spreading code do not correlate in an ideal case and are not restored to the narrow band. They appear thus as noise with respect to the desired signal. The spreading codes of the system are preferably selected in such a way that they are mutually orthogonal, i.e. they do not correlate with each other.

In a typical mobile phone environment, the signals between a base station and a mobile station propagate along several paths between the transmitter and the receiver. This multipath propagation is mainly due to the reflections of the signal from the surrounding surfaces. Signals which have propagated along different paths arrive at the receiver at different times due to their different transmission delays. CDMA differs from the conventional FDMA and TDMA in that the multipath propagation can be exploited in the reception of a signal. One way of realizing a CDMA receiver is to use, for example, a so-called rake receiver, which consists of one or more rake branches. Each branch is an independent receiver unit, the function of which is to compose and demodulate one received signal component. Each rake branch can be caused to synchronize with a signal component which has propagated along an individual path, and in a conventional CDMA receiver the signals of the receiver branches are combined advantageously, for example coherently, whereupon a signal of good quality is obtained. The signal components received by the receiver branches may be transmitted from one base station, or in the case of macrodiversity, from several base stations. The realization of a rake branch is described in greater detail in G. Cooper, C. McGillem: *Modern Communications And Spread Spectrum* (McGraw-Hill, New York, 1986, Chapter 12).

In mobile network applications, the use of long spreading codes provides several advantages. A sufficient length of the spreading code enables almost an unlimited number of different code sequences (by means of which the signals of different users are distinguished from one another), the easy application of cryptographic algorithms, and the use of the same long code at different phases in synchronous networks. In connection with using long codes, the magnitude of the delay spread is unlimited.

The use of long codes has been difficult so far, however, since there are a number of problems related to their use. The code search periods may become long whereupon the synchronization is slow. When long codes are used, the network should typically be synchronous. The receiver must also detect the signal from a partial correlation result, which does not produce an ideal result. In a rake receiver, there may occur problems in code search, measurement of impulse response, the activation of rake branches to receive different signal components, code tracking and synchronization of transmitter and receiver directions. An example of a system utilizing long codes and having the aforementioned problems is the IS-95 standard suggestion, which is incorporated herein by reference.

SUMMARY OF THE INVENTION

The purpose of the present invention is to realize the use of long codes especially in a rake receiver in such a way that the generation of codes and the timing between different receiver blocks can be controlled.

This is achieved with a receiver having a number of means for generating a code sequence, the first means producing a code sequence at a variable phase, and the second means, of which there is at least one, produce a code sequence the phase of which acts as a reference to the first means.

The method according to the invention is characterized in that at least two code generators are utilized in the search of the different signal components of the transmission multiplied with the desired code and in the measurement of the phases of the components, so that the first code generator produces a variable-phase code sequence, and the second code generator produces a code sequence the phase of which is attached to a detected signal component.

The receiver according to the invention knows at all times the common timing, i.e. the phase of the reference code generator, regardless of the reception situation, i.e. whether the receiver is in the process of searching, measuring the impulse response or demodulating. The changes in the code phase of the variable-phase code generator do not have to be recorded. The code tracking may change the phase of the generator in such a way that the signal level is maximized without a need to inform the other parts of the receiver of the changes.

In the receiver according to the invention, it is sufficient in the activation of the rake branches that the demodulation branch is informed of the phase difference of the desired component with respect to the reference phase. The amount of the information to be transmitted is thus a few bits. For example in the IS-95 standard, the rake branch should be informed of the state of the entire generator, i.e. the contents of the shift register, which means a 42-bit message or a suitable bus for transmitting information.

BRIEF DESCRIPTION OF THE DRAWINGS

In the following, the invention will be described in greater detail with reference to the examples according to the accompanying drawings, in which.

DETAILED DESCRIPTION

Figure 1:
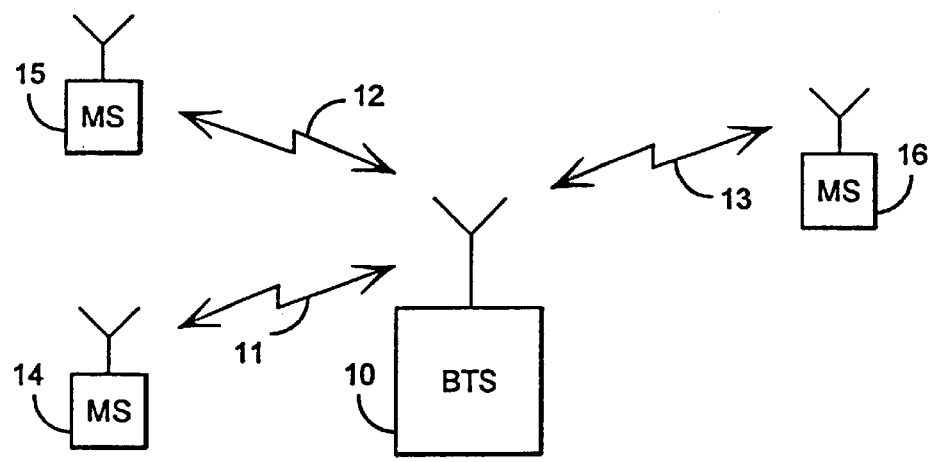
FIG. 1 illustrates a part of a cellular system wherein the method according to the invention can be applied.

FIG. 1 illustrates a part of a cellular system wherein the method according to the invention can be applied. The system comprises a base station 10 which has a bidirectional connection 11 to 13 with subscriber terminals 14 to 16. Each connection typically uses its own spreading code with which the information to be transmitted is multiplied and thus spread to a broad frequency band. On the basis of the spreading code, the receivers can distinguish the desired signal from the other signals transmitted on the same frequency band. The method according to the invention can be applied and the receiver arrangement according to the invention can be utilized both in a terminal equipment and at a base station.

Figure 2:
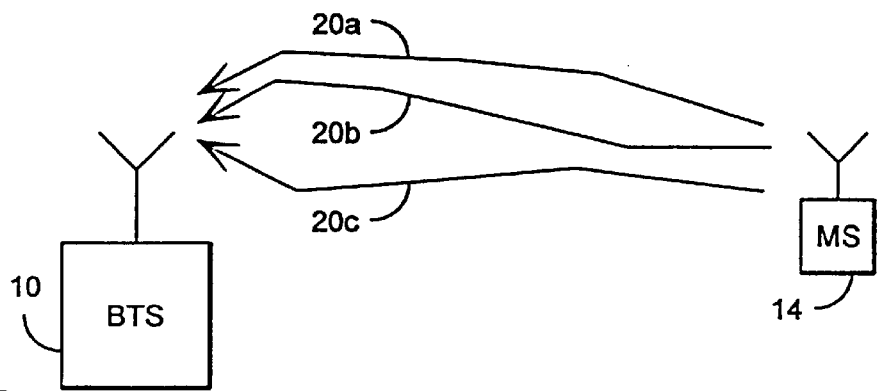
FIG. 2 illustrates in greater detail a connection between a base station and a subscriber terminal.
Figure 3:
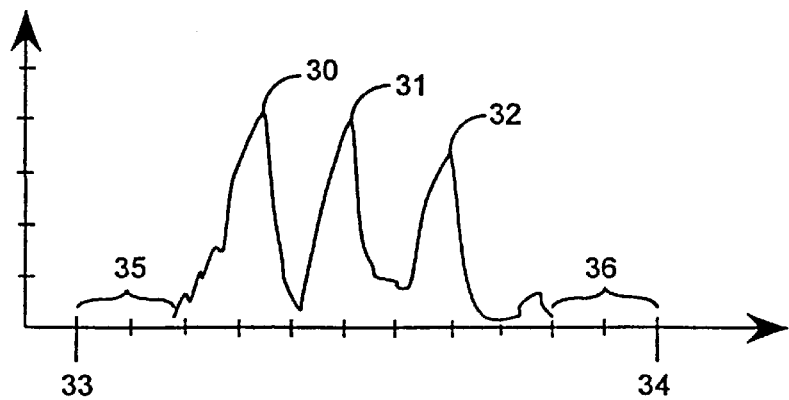
FIG. 3 shows an example of an impulse response typical of a radio connection.

FIG. 2 illustrates in greater detail the connection between a terminal equipment and a base station in the transmission direction from the terminal equipment 14 to the base station 10. As described above, in a typical cellular environment the signals between a terminal equipment and a base station propagate along several different paths between the transmitter and the receiver. This multipath propagation is thus mainly due to the reflections of the signal from the surrounding surfaces. The figure shows the propagation of the signal from the terminal equipment 14 along three different paths 20a to 20c to the base station receiver. Since these signals, which hereafter will be called signal components, have propagated along paths of different lengths between the transmitter and the receiver, they arrive at the receiver at slightly different times and with different phases. This is illustrated in FIG. 3 which shows the impulse response of the radio channel by way of example. The aforementioned three signal components are visible in the impulse response as peaks 30 to 32 that are not simultaneous. The function of the CDMA receiver is to measure the impulse response, i.e. to find the different signal components of the transmitted signal within a certain delay window, to synchronize itself, to demodulate the desired signal components and to combine the demodulated signals advantageously.

Figure 4:
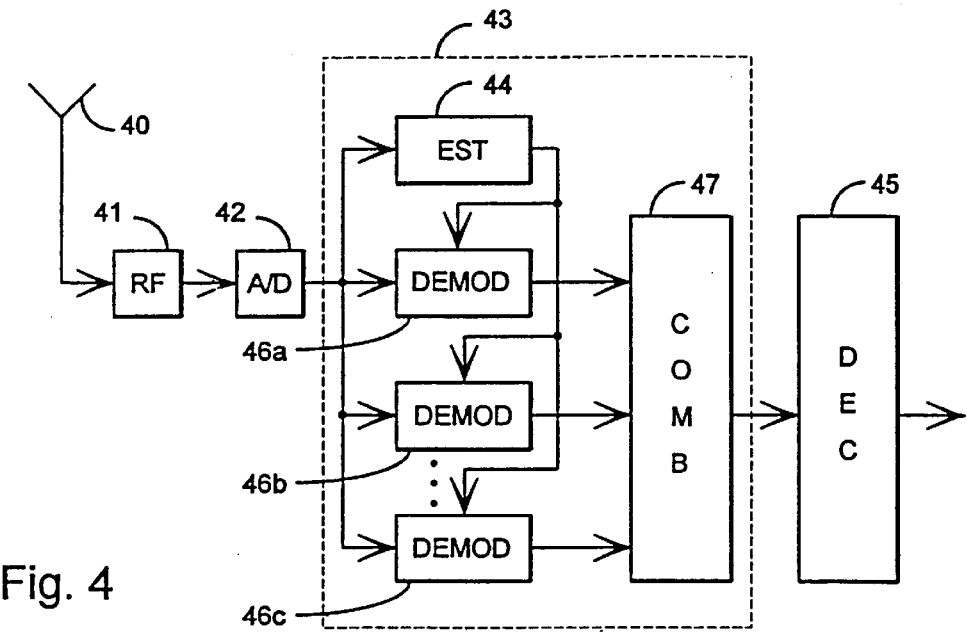
FIG. 4 is a block diagram illustrating an example of a receiver according to the invention.

FIG. 4 is a block diagram generally illustrating an example of a receiver according to the invention. The receiver according to the invention comprises an antenna 40 receiving signals that are supplied to radio-frequency parts 41, wherein a signal is converted to an intermediate frequency. From the radio-frequency parts 41 the signal is further supplied to converter means 42 wherein the received analog signal is converted into digital form. The described radio-frequency parts 41 and the converter means 42 can be implemented in known manners. The receiver further comprises a rake receiver block 43 wherein the received signal is demodulated, and means 45 for decoding the signal.

The rake receiver block 43 comprises channel-estimation means 44, a number of demodulator branches, or rake branches, 46a to 46c, and means 47 for advantageously combining the demodulated signals. The function of the channel-estimation means 44 is to perform on the received signal a search for the signals transmitted with the desired spreading code, the initial synchronization thereof, and the measurement of the channel impulse response, i.e. the search for and measurement of the different signal components of the signal multiplied with the desired spreading code within a certain delay window. On the basis of the measurements performed by the channel-estimation block 44, the rake branches 46a to 46c are activated to receive each their own signal component. The strongest signal components are typically selected for demodulation. When the receiver is a subscriber terminal receiver, the channel-estimation means 44 are also intended to search for the signals of neighboring channels.

The number of the rake branches 46a to 46c in the receiver depends on the application wherein the receiver is used. In a cellular network, the criterion is the number of the multipath-propagated signal components to be distinguished from the radio channel. Each rake branch can be activated to receive one signal component. The spectrum of the wide-band signal component received in the rake branch is composed by correlating the signal component with a reference signal which is at a corresponding phase as the delay of the input signal and which may be a signal produced by a binary code generator. Data concerning the delay of the received signal component, which is required for the synchronization of the rake branch with the signal, is thus obtained from the channel-estimation means 44.

The composed signal is demodulated in the rake branch either coherently, incoherently or differentially coherently, according to the modulation of the received signal. If coherent demodulation is used, the phase of the signal must be known. A data-unmodulated pilot signal is typically used for the estimation of this phase, as it is known to a person skilled in the art. The code phase of the signal received in the rake branch is monitored with a code-tracking loop which may utilize either a data signal or a pilot signal. The signal components that are received and demodulated in the different rake branches are advantageously combined in the means 47. For the combining, the components can be weighted in a desired manner in the rake branches. Optimal diversity combination is thus performed on the signal components in the means 47. The combination of the signal components may be either coherent or incoherent, depending on the application. The means 47 further comprise a decision logic, which makes either a hard or a soft decision from the information symbols of the combined signal. The detected symbols are further supplied to a channel decoder 45. The combining means 47 can be realized in known manners in the receiver according to the invention. It is evident for a person skilled in the art that the receiver naturally comprises also components other than the ones described above, for example filters and speech coders, depending on the type of the receiver; but for the sake of simplicity they have been left out as components not essential to the invention.

Figure 5:
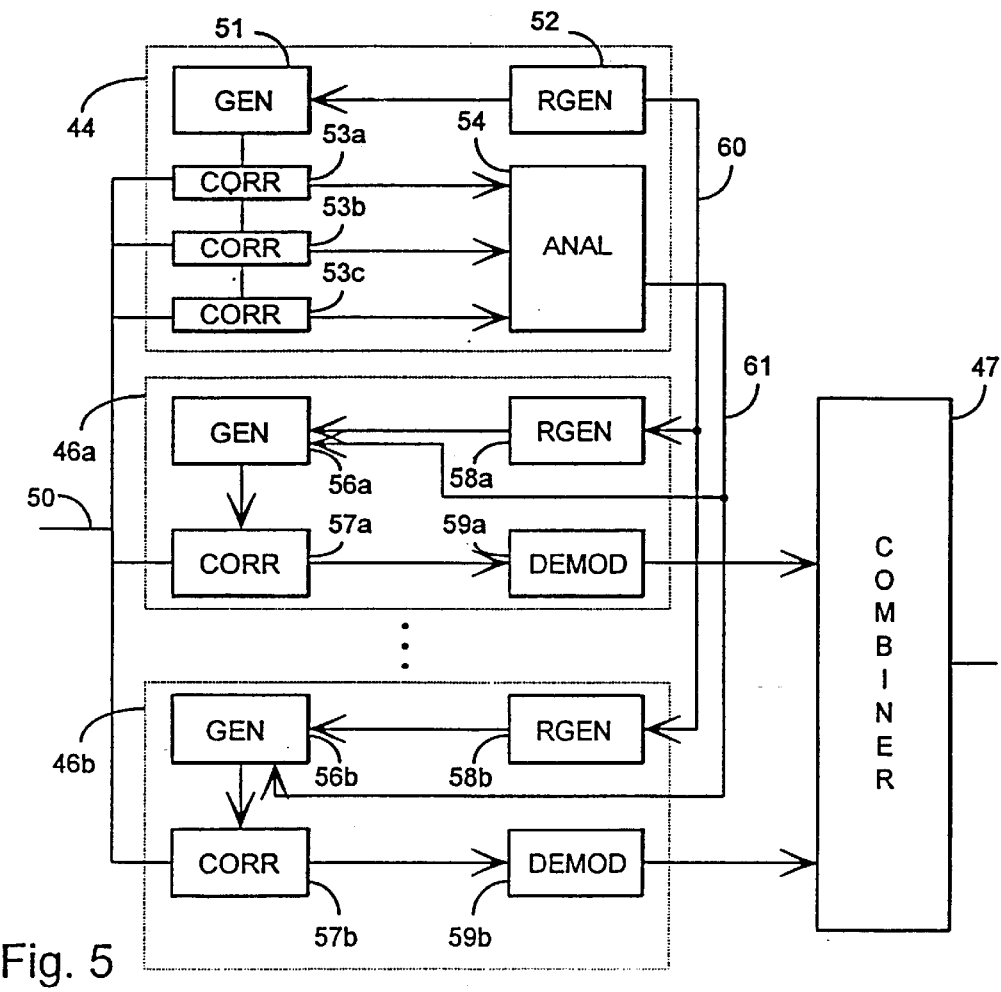
FIG. 5 is a block diagram illustrating in greater detail an example of a receiver according to a preferred embodiment of the invention.

In the following, the block diagram of FIG. 5 is used to describe in greater detail a part of a receiver implementing a preferred embodiment of the invention, and the function of the receiver. The receiver thus comprises a channel-estimation block 44 the function of which is to locate and measure signal components multiplied with a desired spreading code. The receiver according to the invention comprises in the channel-estimation block 44 at least two code generators 51, 52 the output of which provides the desired spreading code having the desired phase. In the beginning, when the receiver is not yet active, the code generators 51, 52 are initialized to the same phase. A typical code generator produces an M sequence, and in such a case the desired generator polynome and the initial state of the coder are initialized in the generator. A possible implementation of the generator is described further on. The coder may be started for example by means of an external starting signal.

Code search

Figure 8:
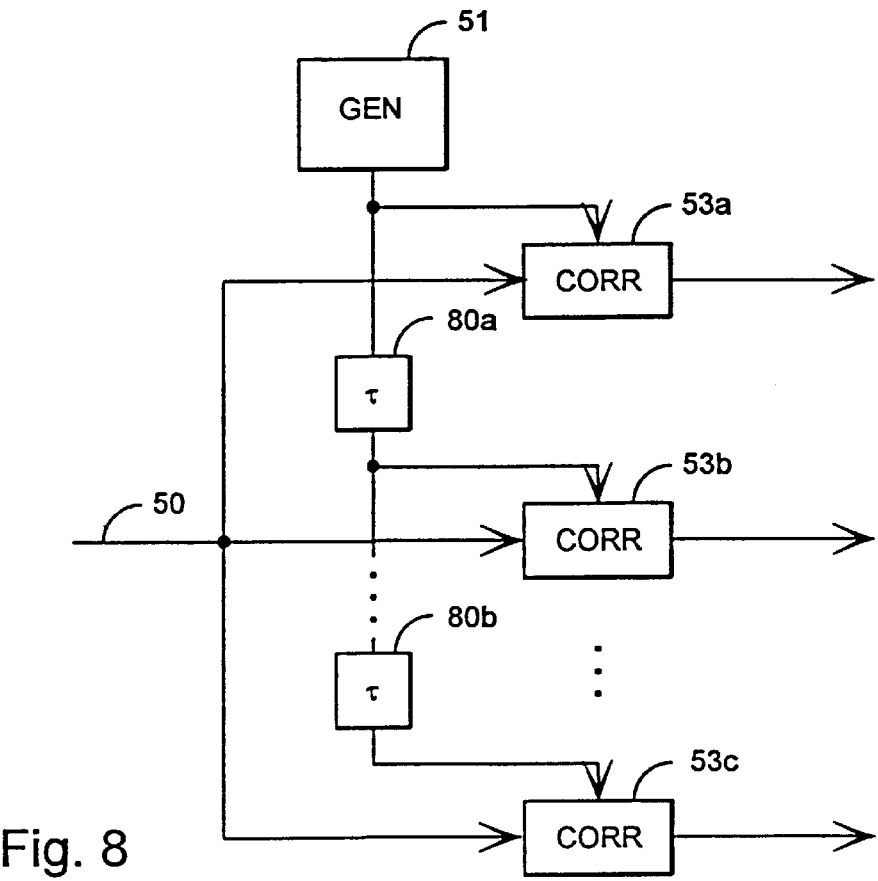
FIG. 8 shows the distribution of a code sequence to different correlators.

The code generator 51 produces a code sequence that is at the original phase and that is supplied to a number of correlators 53a to 53c wherein the received signal is correlated. FIG. 8 shows in greater detail the distribution of the code sequence from the code generator 51 to the different correlators 53a to 53c. The code sequence is supplied to the different correlators, preferably via delay units 80a, 80b, whereupon each correlator 53a to 53c calculates the correlation with a sequence that is at a slightly different phase with the input signal 50 and the code sequence. This provides parallel calculation for successive samples. The number of the correlators 53a to 53c in the channel estimator may vary depending on the application. The correlation results of the correlators are supplied to a measurement-analysing block 54, wherein the obtained result is compared with a given threshold value, which reveals whether the received signal level is sufficiently high. If no signal has been detected, the code phase of the code generator 51 is shifted to the next code phase according to the desired measurement resolution. New measurements are performed with the new code phase in the correlators 53a to 53c, and the results are analyzed in the block 54. The operation continues until a sufficiently strong signal can be detected.

When a sufficiently strong signal level is detected, the phase of the code generator 51 is not altered, but the correlation result is calculated several times with the same code phase, and the average signal level is calculated with the aforementioned code phase. If the obtained averaged measurement result still shows that a sufficiently strong signal component is received with this code phase, the code phase is accepted as the correct one for the signal that is searched for. Otherwise, the search is continued by changing further the phase of the code generator 51 according to the desired measurement resolution. The code phases are systematically checked with this method until the desired signal is found.

When the signal components and the corresponding code phase of the desired signal have been found in the above-described manner, the code timing of the rake receiver can be initialized on the basis of the received signal in such a way that the code phase with which the signal was found is set as the reference phase. This is done by initializing the phase of the reference code generator 52 to the same phase as the phase of the generator 51 which is thus the same code phase with which the signal was found. The phase of the reference code generator 52 is kept constant, i.e. it acts as a reference for the other code generators of the receiver. Its phase is not changed during the code search as in the case of the first code generator 51. The phase of the reference code generator 52 is only altered if the total timing of the receiver changes.

In the receiver according to a preferred embodiment of the invention illustrated in FIG. 5, each rake branch 46a, 46b comprises two code generators 56a, 58a, and 56b, 58b, respectively, the output of which provides the desired spreading code at the desired phase. As in the channel-estimation block 44, in each rake branch one code generator 58a, 58b is reserved as a reference generator. When the code search produces a signal, the corresponding code phase is initialized not only in the reference code generator 52 of the channel-estimation block, but also in each reference code generator 58a, 58b of the rake branch by means of a bus 60. All the reference code generators 52, 58a, 58b of the receiver are thus always at the same phase.

Figure 6:
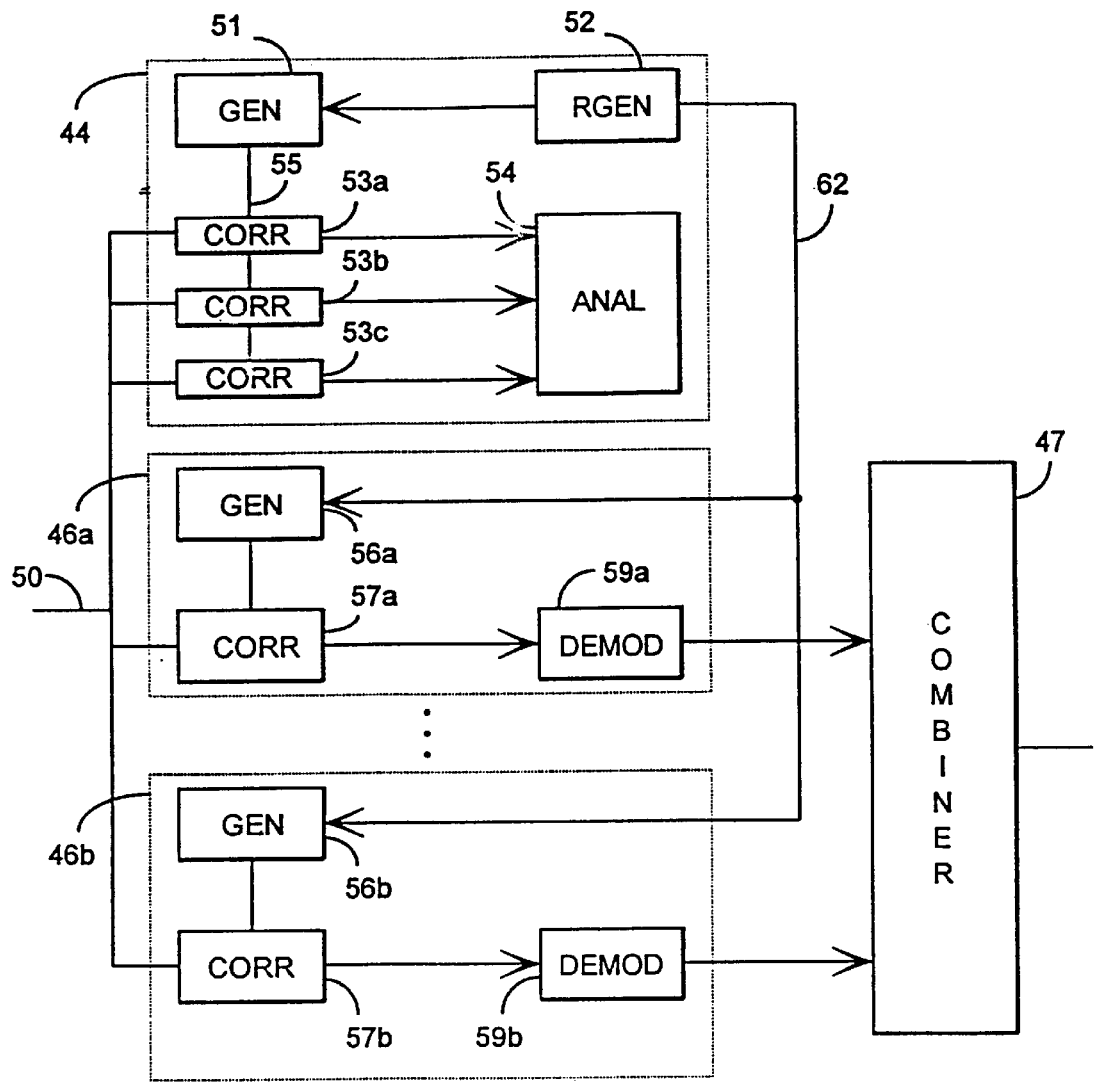
FIG. 6 is a block diagram illustrating in greater detail another example of a receiver according to the invention.

FIG. 6 illustrates a second embodiment of the invention wherein the receiver comprises one reference code generator 52 that is common to the channel-estimation block 44 and the rake branches 46a to 46b. This requires less components than the arrangement of FIG. 5, but the amount of the information to be transmitted between different parts of the receiver is greater.

If M sequences are used as the spreading codes, which is typical, the sequences are generated by means of shift registers, and the code phase is then initialized by setting the state of the coder, i.e. the contents of the shift register, to the desired one. In this case, the contents of the shift registers of the code generator 51 are copied to the shift registers of the reference code generator. This can be realized, for example by means of a parallel output and a load pulse. Another method is to keep a record, during the search, of the number of code phases stepped in the generator 51 and to shift the phase of the reference generator 52 by adding the same number of steps, for example by changing the clock frequency or by increasing or decreasing clock pulses.

Impulse response measurement

When the signal multiplied with the desired spreading code has been found by using the above-described method, the function of the channel-estimation block 44 is to measure the impulse response in order to find the desired number of different signal components with which the rake branches 46a to 46c of the receiver could be synchronized. The operation of the channel-estimation block is in principle similar to the code search. The phase of the code generator is changed and a measurement is performed for finding a transmission. However, since at least one code phase with which a signal is transmitted is known, the desired signal is now assumed to exist at certain code phases, whereupon the code phases have to be checked only within a delay window of a certain size. The size of the delay window, i.e. the greatest mutual delay difference between the different signal components of the same transmitted signal, depends on the propagation conditions of the radio signals, and in the cellular environment a suitable value can be selected as the delay window from the different propagation environments. All the significant multipath-propagated components of the signal, which can be utilized by the demodulator branches of the rake receiver, are assumed to fit inside this delay window. In the example of FIG. 3, the delay window should contain three signal components 30 to 32, and a suitable window size would be the time window between the times 33 and 34 on the horizontal axis.

During the measurement of the impulse response, the phase of the reference generator 52 is not changed. The phase of the first code generator 51 is stepped over the delay window with the desired measurement resolution, which may differ from the resolution used in the code search. The analysing block 54 collects the correlation results in an amount corresponding to the delay window. The analysing block may also control the recharging of the code generator 51, i.e. it may shift the code phase of the generator 51 back to the beginning of the delay window. The measurement results obtained from each round of measurements are averaged to a final impulse response.

Figure 9:
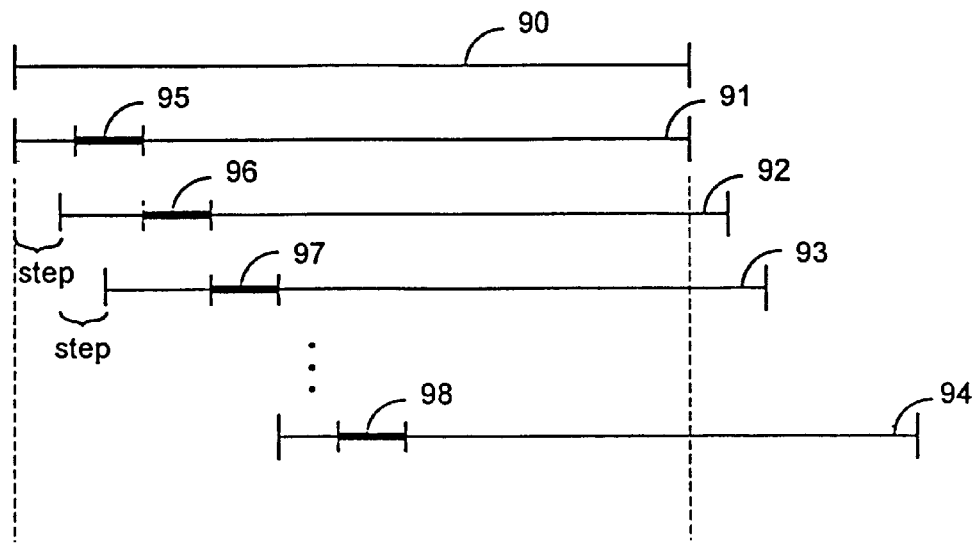
FIG. 9 is a timing diagram illustrating measurement of an impulse response.

The timing diagram of FIG. 9 illustrates the search for the impulse response. The code sequence is denoted by a line 90 and the correlators are stepped according to the given measurement resolution 91 to 94, whereupon the measurement results provide in the example of the figure partial correlations 95 to 98 by means of which the different delay components can be detected. When the desired measurement window has been examined once, for example after the measurement 94, the system goes back to the beginning of the delay window to measure from the area 91 for the purpose of averaging.

If the total timing of the received signal changes, which may result for example from a change in the distance between the terminal equipment and the base station, the place of the delay window is altered by stepping the code phase of the reference code generator 52 either backward or forward to correspond to the new timing. Margins comprising no received signal should be left before and after the delay window to be measured for a change in the timing. This ensures that changes forward and backward in the timing of the received signal are detected. In the example of FIG. 3, margins 35, 36 have been left in the beginning and end of the delay window.

The changes in the timing may be monitored in the receiver by calculating the total energy of the signal over a certain delay spread, which is smaller than the measurement window. The energy of the signal can be calculated in a delay window situated in several different places within the measurement window. The measurement window determined by the reference code generator 52 should be preferably positioned in such a way that the entire delay spread of the signal is centered in the middle of the measurement window.

Activating the rake branches

The measurement result of the impulse response is compared with a given threshold level, and signal components exceeding this level can be utilized in the receiver. The desired signal components can be received each with its own rake branch, demodulated, and combined advantageously. The activation of demodulation occurs by informing an available rake branch of the code generator phase corresponding to the signal component.

In the receiver arrangement of FIG. 5, the rake branch is informed of the desired code phase as a relative difference to the phase of the reference code generator. The reference code generators 52, 58a, 58b of both the channel-estimation block 44 and all the rake branches 46a, 46b are at the same phase in the arrangement according to the invention. Data concerning the relative difference can be transmitted from the channel-estimation block to the rake branches by means of a few bits, i.e. the data does not require a long transmission time but it can be forwarded quickly, and no fast bus interface is required for the transmission, but a slower connection 61 is sufficient. In the rake branch, the code generator 57a, 57b is first set to the same phase as the reference code generator, and a number of steps, determined by the relative difference, are taken until the correct phase is obtained and the detection and monitoring of the desired signal component can be started. The reference phase is thus needed in the rake branches only in activation situations.

In the arrangement of FIG. 6 wherein the reference code generator 52 is shared, the allocation of the rake branches occurs correspondingly in such a way that the phase of the reference code generator is loaded into the code generator, and the phase is deflected with a number of steps determined by the relative difference. As distinguished from the above, the reference code generator 52 and the code generators should be connected with a fast bus 62 over which the data concerning the generator state is transmitted. The data concerning the relative difference can be transmitted over a slower line 61, as above.

Figure 7:
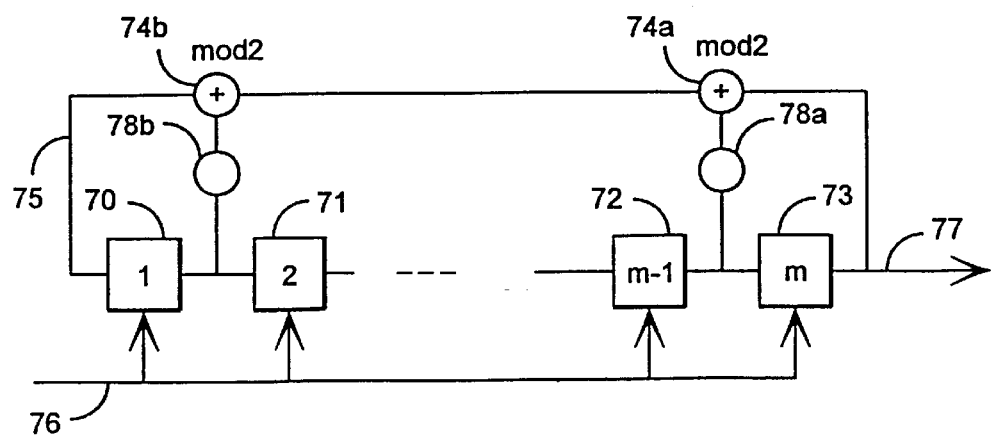
FIG. 7 illustrates a possible way of generating spreading codes.

The structure of the code generator is not significant in the receiver according to the invention, but the invention is applicable with code generators of all types. An example of a possible way of implementing a code generator is the aforementioned shift register structure with which M sequences that are generally used as spreading codes can be generated. FIG. 7 is a block diagram illustrating a possible way of implementing a code generator by means of a shift register. The shift register comprises m stages 70 to 73 which are connected in series, and in which a modulo-2 adder 74a, 74b is coupled to the outputs of some stages via weighting coefficients 78a, 78b, the output of the adders being fed back to an input 75. All the stages 70 to 73 are timed simultaneously by means of a common clock signal 76. Whenever a clock pulse arrives, a new binary number arrives at the output 77.

If a specific phase of a specific code is to be set in the generator of the type described above, the desired values must be copied to the stages 70 to 73. The generators can be initialized either by means of software as the reading and writing operations of the processor 54, or by means of fixed connections.

Even though the invention is described above with reference to the examples according to the accompanying drawings, it is clear that the invention is not restricted thereto, but it can be modified in many ways within the scope of the inventive idea claimed in the appended claims.

I claim:

1. A receiver for use in a system wherein a signal to be transmitted is multiplied with a code sequence characteristic of each connection comprising:

at least one demodulator means;

means for estimating a channel operatively coupled in parallel with said at least one demodulator means;

means for combining signal components received from said at least one demodulator means; and plurality of means for generating a code sequence, including a first means for generating a code sequence at a variable phase for said at least one demodulator means, and at least one second means for generating a code sequence having a phase which acts as a reference to said first means.

2. The receiver according to claim 1, wherein:

said second means is arranged to generate as a respective code sequence having a same phase as the phase of a code sequence contained in a received signal component.

3. The receiver according to claim 1, wherein said means for estimating a channel comprise:

means for correlating a received signal with a code sequence which is generated in said first means for generating a code sequence, to provide a correlation;

means which measure the magnitude of the correlation provided by said correlating means; and means which control the phase of said code sequence of said first means.

4. The receiver according to claim 1, wherein:

said means for estimating a channel and said at least one demodulator means each comprise one said first means for generating a code sequence at a variable phase and one said means for generating a code sequence acting as a reference.

5. The receiver according to claim 3, wherein:

said means for estimating a channel comprise means for informing said first means, said demodulator means, of a desired code phase as a relative deviation from the code phase of said second means.

6. A method for generating a spreading code in a receiver, comprising the steps of:

multiplying a signal to be transmitted with a code sequence characteristic of a respective connection;

receiving a transmission of said signal and seeking receiver signal components transmitted with a desired code from said received transmission including signal components of the received transmission; and measuring the phases of the signal components of the received transmission by correlating the received transmission with a code sequence generated in the receiver;

said seeking and said measuring including utilizing at least two code generators respectively in a search of said signal components of the received transmission, multiplied with said desired code, and in said measuring of the phases of the signal components, so that a first code generator produces a variable-phase code sequence, and a second code generator produces a code sequence the phase of which is attached to each respective received signal component.

7. The method according to claim 6, comprising:

multiplying the phases of the received signal components to different demodulation blocks of the receiver as relative deviations of the phase of each respective received signal component from the phase of a respective code sequence used as a reference.

8. The method according to claim 6, comprising:

searching for a first signal component in the beginning of a connection;

stepping the phase of the first code generator with a desired resolution when the first signal component is searched for;

calculating a correlation between the received transmission and sequence generated by the first generator at each step, to provide a calculated correlation, until the calculated correlation exceeds a given threshold value; and copying the code phase of the first generator at which said given threshold value was exceeded, to the second generator.

9. The method according to claim 8, comprising:

when measuring from the received transmission the phases of the respective signal components of the received transmission multiplied with the respective code sequences, stepping the first code generator with said desired resolution around the phase of the second code generator in a time window of desired size.

10. The method according to claim 6, comprising:

searching for a first signal component in the beginning of a connection;

stepping the phase of the first code generator with a desired resolution when the first signal component is searched for;

calculating a correlation between the received transmission and sequence generated by the first generator at each step to provide a calculated correlation, until the calculated correlation exceeds a given threshold value; and copying the code phase of the first generator at which said given threshold value was exceeded, to the second generator.

11. The method according to claim 10, further comprising:

initializing the second code generator of each demodulator block to a same phase as the second code generator.

* * * * *